T. J. HINES.
BORING TOOL.
APPLICATION FILED MAY 10, 1909.
963,559.
Patented July 5, 1910.
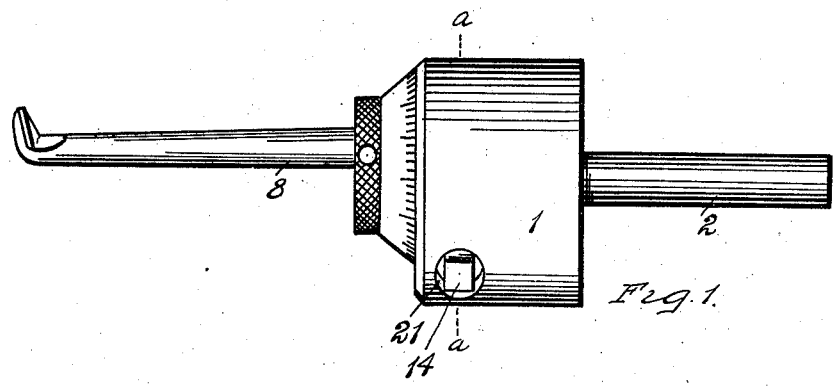
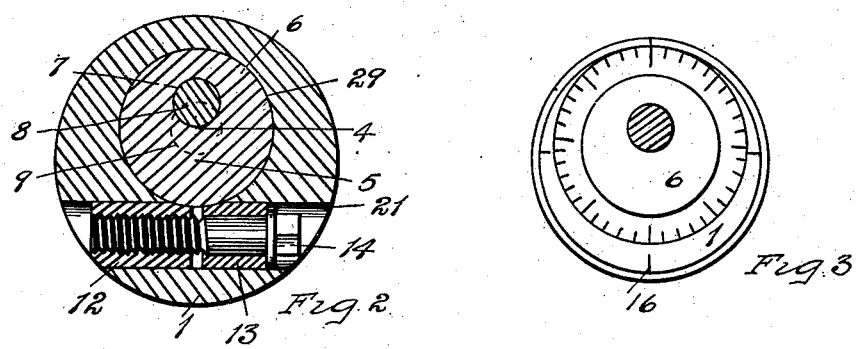
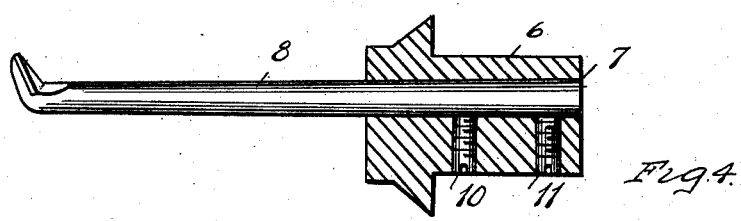
Witnesses
C. E. Doy.
V. C. Spratt
Inventor
Thomas J. Hines
Parker & Burton
Attorneys

UNITED STATES PATENT OFFICE.

THOMAS J. HINES, OF DETROIT, MICHIGAN.

BORING-TOOL.

963,559.  Specification of Letters Patent.  Patented July 5, 1910.

Application filed May 10, 1909. Serial No. 495,160.

*To all whom it may concern:*

Be it known that I, THOMAS J. HINES, a citizen of the United States, residing at Detroit, county of Wayne, State of Michigan, have invented a certain new and useful Improvement in Boring-Tools, and declare the following to be a full, clear, and exact description of the same, such as will enable others skilled in the art to which it pertains to make and use the same, reference being had to the accompanying drawings, which form a part of this specification.

This invention relates to boring tools, and has for its object an improved head adapted to be used with a lathe and employed to bore holes of various diameters within the limit of its capacity.

In the drawing:—Figure 1, is a side elevation of the tool. Fig. 2, a cross-section at the line $a$—$a$ of Fig. 1. Fig. 3 an elevation showing the vernier graduations. Fig. 4, a longitudinal section of the secondary holder of the tool.

The head of the tool 1 is provided with means by which it may be held in the lathe in a suitable manner, as for example, with a tang 2 adapted to be held centrally by a chuck carried by a lathe head. The head 1 is provided with a longitudinal cylindrical bore, or socket 21, whose axis is parallel to the axis of the tool head 1, and whose center 4 is eccentric to the center 5 of the tool head 1. It is also provided with a cross-bore 21 parallel to a diameter. A subordinate or secondary tool holder 6 engages in this bore or socket and is capable of rotation on its own axis therein. The subordinate holder 6 is provided with a bore 7 adapted to receive the tang of the tool 8. The bore 7 is eccentric to the center 4 of the subordinate tool holder, and the rotation of the subordinate tool holder on its own axis rotates the tool, carrying it around the curved path indicated by the dotted line 9 in Fig. 2.

The tool proper is held in the subordinate holder 6 by means of set screws 10 and 11 which hold the tool securely with respect to the subordinate holder. The subordinate holder is held in the head 1 by means of a clamp consisting of two jaw members 12 and 13 held together by means of a prismatic headed screw 14. The screw engages through one of the jaw members 12 and into the other jaw member 13 and the jaw members are drawn together by means of the screw or are loosened by turning the screw to free them. The clamp engages in the cross-bore 21, which crosses the head 1 parallel with the diameter thereof, and with the bore of the hole cutting into the bore of the socket in which the subordinate tool holder engages. The meeting ends of the two jaw members 12 and 13 are trimmed to present curved faces of the trimmed part just within the socket so that if the two jaw members be spread somewhat the subordinate holder will easily engage in the socket, and then if the screw 14 be turned to bring the jaw members together, the jaw members will bear with force against the subordinate tool holder clamping it very firmly in position, and clamping it without abrading or destroying the surface against which the jaw members engage. The subordinate tool holder projects beyond the head 1 and the projecting part is coned somewhat, and on the conical surface are graduations extending entirely around the periphery of this part of the subordinate tool holder.

On the face of the tool head 1 are a number of graduations 16, which co-act as a vernier scale with the graduations on the subordinate tool head; as shown in the drawing this vernier scale will enable the tool head to be set to quarters of the graduations of the subordinate tool holder; as shown are graduations in 40 divisions; with the graduations shown the workman is able to set the tool head to the 160th part of a revolution. The graduations and vernier of course, may be made to any scale or to any proportion of a circle.

Beyond the graduated part of the subordinate holder is a knurled grip section 23 to aid in turning the subordinate holder in the head.

What I claim is:—

1. A boring tool, having in combination a head provided with an eccentrically located cylindrical holder socket and with a transverse passage of uniform diameter extending across said head parallel to the diameter thereof and intersecting said holder socket, a tool holder provided with an eccentrically located tool socket, a tool grip comprising movable jaws and a coupling screw engaging in said transverse passage. the meeting ends of said jaws being adapted to be drawn by said coupling screw into gripping engagement with the tool holder inserted in said holder socket, substantially as described.

2. A boring tool, having in combination a tool head provided with an eccentrically located cylindrical holder socket with a transverse passage of uniform diameter extending across said head parallel to a diameter thereof, and with a graduated face at the front of said head, a tool holder provided with an eccentrically located tool socket and with a graduated face adapted to co-act in vernier relation with the graduations on said head, a tool holder grip, comprising movable jaws and a coupling screw engaging in said transverse passage, substantially as described.

In testimony whereof, I sign this specification in the presence of two witnesses.

THOMAS J. HINES.

Witnesses:
CHARLES F. BURTON,
VIRGINIA C. SPRATT.